US008893785B2

(12) United States Patent
Skinner et al.

(10) Patent No.: US 8,893,785 B2
(45) Date of Patent: Nov. 25, 2014

(54) LOCATION OF DOWNHOLE LINES (75) Inventors: Neal G. Skinner, Lewisville, TX (US); Michael L. Fripp, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 252 days.

(21) Appl. No.: 13/494,826

(22) Filed: Jun. 12, 2012

(65) Prior Publication Data
US 2013/0329522 A1 Dec. 12, 2013

(51) Int. Cl.
*E21B 43/119* (2006.01)
*E21B 47/024* (2006.01)

(52) U.S. Cl.
USPC ............ 166/255.2; 166/177.2; 166/298; 166/55.1; 175/4.51

(58) Field of Classification Search
CPC ..... E21B 47/14; E21B 47/024; E21B 47/123; E21B 43/11; E21B 43/119; E21B 47/091
USPC ........... 166/255.2, 298, 55, 177.2, 297, 55.1; 175/4.51
See application file for complete search history.

(56) References Cited

U.S. PATENT DOCUMENTS

| | | | |
|---|---|---|---|
| 2,210,417 A | 8/1940 | Kinley | |
| 2,242,161 A | 5/1941 | Athy et al. | |
| 2,728,554 A | 12/1955 | Goble | |
| 2,739,475 A | 3/1956 | Nowak | |
| 2,803,526 A | 8/1957 | Nowak | |
| 3,426,850 A | 2/1969 | McDuffie, Jr. | |
| 3,480,079 A | 11/1969 | Guinn et al. | |
| 3,704,749 A | 12/1972 | Estes et al. | |
| 3,706,344 A | 12/1972 | Vann | |
| 3,776,323 A | 12/1973 | Spidell et al. | |
| 3,812,911 A | 5/1974 | Vann | |
| 3,864,969 A | 2/1975 | Smith, Jr. | |
| 3,871,448 A | 3/1975 | Vann et al. | |

(Continued)

FOREIGN PATENT DOCUMENTS

| CA | 2320394 A1 | 4/2001 |
|---|---|---|
| CA | 2626596 C | 4/2009 |

(Continued)

OTHER PUBLICATIONS

Naotsugu Ikeda, "Fractured Reservoir Management by Fiber Optic Distributed Temperature Measurement," Sep. 27-28, 2000, 6 pages.

(Continued)

*Primary Examiner* — Jennifer H Gay
(74) *Attorney, Agent, or Firm* — Smith IP Services, P.C.

(57) ABSTRACT

A method of determining an azimuthal orientation of a well tool relative to a line in a well can include connecting at least one acoustic source to the well tool, the acoustic source having a known azimuthal orientation relative to the well tool, and detecting at least one acoustic signal transmitted from the acoustic source to an acoustic sensor, the acoustic sensor having a known azimuthal orientation relative to the line. A system for determining an azimuthal orientation of one or more lines relative to a well tool in a wellbore can include at least one acoustic source having a known azimuthal orientation relative to the well tool, and an optical waveguide connected to a distributed acoustic sensing instrumentation, the waveguide having a known azimuthal orientation relative to the lines, and in which the distributed acoustic sensing instrumentation detects acoustic signals transmitted from the acoustic source to the waveguide.

30 Claims, 4 Drawing Sheets

(56) References Cited

U.S. PATENT DOCUMENTS

| | | | |
|---|---|---|---|
| 3,931,855 A | 1/1976 | Vann et al. | |
| 4,040,485 A | 8/1977 | Vann et al. | |
| 4,046,220 A | 9/1977 | Glenn, Jr. | |
| 4,330,037 A | 5/1982 | Richardson et al. | |
| 4,410,041 A | 10/1983 | Davies et al. | |
| 4,520,666 A | 6/1985 | Coblentz et al. | |
| 4,575,260 A | 3/1986 | Young | |
| 4,641,028 A | 2/1987 | Taylor et al. | |
| 4,641,724 A | 2/1987 | Chow et al. | |
| 4,703,175 A | 10/1987 | Salour et al. | |
| 4,714,342 A | 12/1987 | Jackson et al. | |
| 4,832,121 A | 5/1989 | Anderson | |
| 4,976,142 A | 12/1990 | Perales | |
| 5,138,876 A | 8/1992 | Moore et al. | |
| 5,163,321 A | 11/1992 | Perales | |
| 5,182,779 A | 1/1993 | D'Agostino et al. | |
| 5,194,847 A | 3/1993 | Taylor et al. | |
| 5,249,251 A | 9/1993 | Egalon et al. | |
| 5,259,466 A | 11/1993 | Venditto et al. | |
| 5,271,675 A | 12/1993 | Fagan et al. | |
| 5,318,123 A | 6/1994 | Venditto et al. | |
| 5,326,969 A | 7/1994 | Fagan et al. | |
| 5,380,995 A | 1/1995 | Udd et al. | |
| 5,451,772 A | 9/1995 | Narendran | |
| 5,488,224 A | 1/1996 | Fagan et al. | |
| 5,509,474 A | 4/1996 | Cooke, Jr. | |
| 5,557,406 A | 9/1996 | Taylor et al. | |
| 5,582,248 A | 12/1996 | Estes | |
| 5,862,273 A | 1/1999 | Pelletier | |
| 6,003,597 A | 12/1999 | Newman | |
| 6,003,599 A | 12/1999 | Huber et al. | |
| 6,004,639 A | 12/1999 | Quigley et al. | |
| 6,032,739 A | 3/2000 | Newman | |
| 6,041,860 A | 3/2000 | Nazzal et al. | |
| 6,065,540 A | 5/2000 | Thomeer et al. | |
| 6,082,454 A | 7/2000 | Tubel | |
| 6,173,773 B1 | 1/2001 | Almaguer et al. | |
| 6,233,374 B1 | 5/2001 | Ogle et al. | |
| 6,233,746 B1 | 5/2001 | Skinner | |
| 6,281,489 B1 | 8/2001 | Tubel et al. | |
| 6,378,607 B1 | 4/2002 | Ryan et al. | |
| 6,380,534 B1 | 4/2002 | Farhadiroushan et al. | |
| 6,408,943 B1 | 6/2002 | Schultz et al. | |
| 6,437,326 B1 | 8/2002 | Yamate et al. | |
| 6,508,307 B1 | 1/2003 | Almaguer | |
| 6,531,694 B2 | 3/2003 | Tubel et al. | |
| 6,557,630 B2 | 5/2003 | Harkins et al. | |
| 6,588,266 B2 | 7/2003 | Tubel et al. | |
| 6,590,647 B2 | 7/2003 | Stephenson | |
| 6,618,677 B1 | 9/2003 | Brown | |
| 6,725,927 B2* | 4/2004 | Ohmer | 166/255.1 |
| 6,751,556 B2 | 6/2004 | Schroeder et al. | |
| 6,789,621 B2 | 9/2004 | Wetzel et al. | |
| 6,828,547 B2 | 12/2004 | Tubel et al. | |
| 6,837,310 B2 | 1/2005 | Martin | |
| 6,913,079 B2 | 7/2005 | Tubel | |
| 6,920,395 B2 | 7/2005 | Brown | |
| 6,977,367 B2 | 12/2005 | Tubel et al. | |
| 6,978,832 B2 | 12/2005 | Gardner et al. | |
| 6,981,549 B2 | 1/2006 | Morales et al. | |
| 6,992,048 B2 | 1/2006 | Reddy et al. | |
| 6,997,256 B2 | 2/2006 | Williams et al. | |
| 7,000,696 B2 | 2/2006 | Harkins | |
| 7,000,699 B2 | 2/2006 | Yang et al. | |
| 7,021,146 B2 | 4/2006 | Nash et al. | |
| 7,040,390 B2 | 5/2006 | Tubel et al. | |
| 7,055,604 B2 | 6/2006 | Jee et al. | |
| 7,066,284 B2 | 6/2006 | Wylie et al. | |
| 7,086,484 B2 | 8/2006 | Smith, Jr. | |
| 7,114,564 B2 | 10/2006 | Parrott et al. | |
| 7,140,435 B2 | 11/2006 | Defretin et al. | |
| 7,140,437 B2 | 11/2006 | McMechan et al. | |
| 7,282,697 B2 | 10/2007 | Thomas et al. | |
| 7,345,953 B2 | 3/2008 | Crickmore et al. | |
| 7,385,523 B2* | 6/2008 | Thomeer et al. | 340/854.8 |
| 7,430,903 B2 | 10/2008 | Ramos | |
| 7,504,618 B2 | 3/2009 | Hartog et al. | |
| 7,946,341 B2 | 5/2011 | Hartog et al. | |
| 8,020,616 B2 | 9/2011 | Greenaway | |
| 8,028,751 B2 | 10/2011 | Pinto et al. | |
| 8,201,625 B2* | 6/2012 | Almaguer | 166/250.08 |
| 8,365,814 B2* | 2/2013 | Hill et al. | 166/55.1 |
| 8,439,114 B2* | 5/2013 | Parrott et al. | 166/297 |
| 8,505,625 B2* | 8/2013 | Ravi et al. | 166/250.14 |
| 2002/0040963 A1 | 4/2002 | Clayton et al. | |
| 2002/0185275 A1* | 12/2002 | Yang et al. | 166/297 |
| 2003/0094281 A1 | 5/2003 | Tubel | |
| 2003/0159826 A1* | 8/2003 | Ohmer | 166/298 |
| 2003/0166470 A1 | 9/2003 | Fripp et al. | |
| 2003/0205083 A1 | 11/2003 | Tubel et al. | |
| 2003/0236626 A1 | 12/2003 | Schroeder et al. | |
| 2004/0040707 A1 | 3/2004 | Dusterhoft et al. | |
| 2004/0084180 A1 | 5/2004 | Shah et al. | |
| 2004/0104029 A1* | 6/2004 | Martin | 166/298 |
| 2004/0109228 A1 | 6/2004 | Aronstam | |
| 2004/0238167 A1 | 12/2004 | Pinto et al. | |
| 2005/0120796 A1 | 6/2005 | Nash et al. | |
| 2005/0149264 A1 | 7/2005 | Tarvin et al. | |
| 2006/0010973 A1 | 1/2006 | Brown | |
| 2006/0048937 A1* | 3/2006 | Pinto et al. | 166/255.2 |
| 2006/0109746 A1 | 5/2006 | Crickmore et al. | |
| 2006/0133203 A1 | 6/2006 | James et al. | |
| 2007/0234788 A1 | 10/2007 | Glasbergen et al. | |
| 2008/0068586 A1 | 3/2008 | Kishida et al. | |
| 2008/0088846 A1 | 4/2008 | Hayward et al. | |
| 2008/0170466 A1 | 7/2008 | Mickael | |
| 2008/0181554 A1 | 7/2008 | Taverner et al. | |
| 2008/0264639 A1 | 10/2008 | Parrott et al. | |
| 2009/0114386 A1 | 5/2009 | Hartog et al. | |
| 2009/0200021 A1* | 8/2009 | Pinto et al. | 166/255.2 |
| 2011/0088462 A1* | 4/2011 | Samson et al. | 73/152.18 |
| 2011/0308788 A1 | 12/2011 | Ravi et al. | |
| 2012/0014211 A1 | 1/2012 | Maida, Jr. et al. | |
| 2012/0016587 A1 | 1/2012 | Sierra et al. | |
| 2012/0111560 A1 | 5/2012 | Hill et al. | |
| 2012/0193143 A1* | 8/2012 | Hill et al. | 175/4.51 |
| 2013/0329522 A1* | 12/2013 | Skinner et al. | 367/25 |
| 2014/0199017 A1* | 7/2014 | Den Boer et al. | 385/12 |
| 2014/0208843 A1* | 7/2014 | Godfrey | 73/152.58 |

FOREIGN PATENT DOCUMENTS

| | | |
|---|---|---|
| EP | 0910725 B1 | 7/2003 |
| EP | 1355166 A2 | 10/2003 |
| EP | 1355169 A2 | 10/2003 |
| EP | 1357401 A2 | 10/2003 |
| GB | 2230086 A | 10/1990 |
| GB | 2362462 A | 11/2001 |
| GB | 2364380 A | 1/2002 |
| GB | 2364381 A | 1/2002 |
| GB | 2364384 A | 1/2002 |
| GB | 2367890 A | 4/2002 |
| GB | 2386625 A | 9/2003 |
| GB | 2397646 A | 7/2004 |
| GB | 2408327 A | 5/2005 |
| GB | 2408328 A | 5/2005 |
| GB | 2408329 A | 5/2005 |
| GB | 2408531 A | 6/2005 |
| SU | 1294985 A1 | 3/1987 |
| WO | 0075485 A1 | 12/2000 |
| WO | 03021301 A2 | 3/2003 |
| WO | 03083248 A2 | 10/2003 |
| WO | 04001356 A2 | 12/2003 |
| WO | 2004020789 A2 | 3/2004 |
| WO | 2004020790 A2 | 3/2004 |
| WO | 2004076815 A1 | 9/2004 |
| WO | 2004081509 A1 | 9/2004 |
| WO | 2004085795 A1 | 10/2004 |
| WO | 2004094961 A1 | 11/2004 |
| WO | 2004114487 A1 | 12/2004 |
| WO | 2005035943 A1 | 4/2005 |
| WO | 2005064117 A1 | 7/2005 |

(56) References Cited

FOREIGN PATENT DOCUMENTS

WO 2005116388 A1 12/2005
WO 2008098380 A1 8/2008

OTHER PUBLICATIONS

John Fagley, H.S. Fogler, C.B. Davenport, and R.S. Millhone, "An Improved Simulation for Interpreting Temperature Logs in Water Injection Wells," SPE 10081, Oct. 1982, 10 pages.
R.N. Horn, J.L. Perrick, and J. Barua, "The Use of Microcomputers in Well Test Data Acquisition and Analysis," SPE 15308, Jun. 18-20, 1986, SilverCreek, CO, 9 pages.
M.Y. Soliman, "Technique for Considering Fluid Compressibility and Temperature Changes in Mini-Frac Analysis," SPE 15370, Oct. 5-8, 1986, New Orleans, LA, 11 pages.
W.S. Lee, "Study of the Effects of Fluid Rheology on Minifrac Analysis," SPE 16916, Sep. 27-30, 1987, Dallas, TX, 10 pages.
B. Bjornstad, T. Kvisteroy, and M. Eriksrud, "Fibre Optic Well Monitoring System," SPE 23147, Sep. 3-6, 1991, Aberdeen, 8 pages.
M.P. Cleary, D.E. Johnson, H.H. Kogsboll, K.A. Owens, K.F. Perry, C.J. de Pater, A. Stachel, H. Schmidt, and M. Tambini, "Field Implementation of Proppant Slugs to Avoid Premature Screen-Out of Hydraulic Fractures with Adequate Proppant Concentration," SPE 25892, Apr. 12-14, 1993, Denver, CO, 16 pages.
G. Botto, B. Maggioni and A. Schenato, "Electronic, Fiber-Optic Technology: Future Options for Permanenet Reservoir Monitoring," SPE 28484, Sep. 25-28, 1994, New Orleans, LA, 10 pages.
O.S. Karaman, R.L. Kutlik, and E.L. Kluth, "A Field Trial to Test Fiber Optic Sensors for Downhole Temperature and Pressure Measurements, West Coalinga Field, California," SPE 35685, May 22-24, 1996, Anchorage, AK, 7 pages.
L. Saputelli, H. Mendoza, J. Finol, L. Rojas, E. Lopez, H. Bravo, and S. Buitriago, "Monitoring Steamflood Performance through Fiber Optic Temperature Sensing," SPE 54104, Mar. 17-19, 1999, Bakersfield, CA, 7 pages.
B.D. Carnahan, R.W. Clanton, K.D. Koehler, G.O. Harkins, and G.R. Williams, "Fiber Optic Temperature Monitoring Technology," SPE 54599, May 26-28, 1999, Anchorage, AK, 10 pages.
Klas Eriksson, "Fiber Optic Sensing—Case of 'Solutions Looking for Problems'," SPE 71829, Aberdeen, Scotland, Sep. 4-7, 2001, 5 pages.
D. Callison, J. Jones, B. Shelley, and R. Lockman, "Integrated Modeling of a Field of Wells—An Evaluation of Western Shallow Oil Zone Completion Practices in the Elk Hills Field, Kern County, California," SPE 76724, Anchorage, AK, May 20-22, 2002, 10 pages.
G. Corbett, E. Fagervik, S. Christie, B. Smith, and K. Falcon, "Fiber Optic Monitoring in Openhole Gravel Pack Completions," SPE 77682, San Antonio, TX, Sep. 29-Oct. 2, 2002, 14 pages.
G.A. Brown, and A. Hartog, "Optical Fiber Sensors in Upstream Oil & Gas," SPE 79080, 2002, 3 pages.
G. Brown, D. Storer, K. McAllister, M. al-Asimi, and K. Raghavan, "Monitoring Horizontal Producers and Injectors During Cleanup and Production Using Fiber-Optic-Distributed Temperature Measurements," SPE 84379, Oct. 5-8, 2003, Denver, CO, 6 pages.
D.O. Johnson, R. Sugianto, P.H. Mock, and C.H. Jones, "Identification of Steam-Breakthrough Intervals with DTS Technology," SPE 87631, Feb. 2004, 8 pages.
H. Foucault, D. Poilleux, A. Djurisic, M. Slikas, J. Strand, and R. Silva, "A Successful Experience for Fiber Optic and Water Shut Off on Horizontal Wells With Slotted Liner Completion in an Extra Heavy Oil Field," SPE 89405, Apr. 17-21, 2004, Tulsa, OK, 6 pages.
B. Hasebe, A. Hall, B. Smith, J. Brady, and P. Mehdizadeh, "Field Qualification of Four Multiphase Flowmeters on North Slope, Alaska," SPE 90037, Sep. 26-29, 2004, Houston, TX, 13 pages.
A. Bond, C. Blount, T. Kragas, and S. Mathias, "Use of a Fiber Optic Pressure/Temperature Gauge in an Exploration Well to Minimize Formation Damage Potential and Reduce Costs During Production Testing," SPE 90130, Sep. 26-29, 2004, Houston, TX, 10 pages.

L.B. Ouyang, and D. Belanger, "Flow Profiling via Distributed Temperature Sensor (DTS) System—Expectation and Reality," SPE 90541, Sep. 26-29, 2004, Houston, TX, 14 pages.
D.K. Nath, "Fiber Optics Used to Support Reservoir Remperature Surveillance in Duri Steamflood," SPE 93240, Apr. 5-7, 2005, Jakarta, Indonesia, 9 pages.
G. Glasbergen, D. van Batenburg, M. van Domelen, and R. Gdanski, "Field Validation of Acidizing Wormhole Models," SPE 94695, May 25-27, 2005, Scheveningen, The Netherlands, 11 pages.
G. Brown, V. Carvalho, A. Wray, A. Sanchez, and G. Gutierrez, "Slickline With Fiber-Optic Distributed Temperature Monitoring for Water-Injection and Gas Lift Systems Optimization in Mexico," SPE 94989, Jun. 20-23, 2005, Rio de Janeiro, Brazil, 10 pages.
K. Yoshioka, D. Zhu, A.D. Hill, P. Dawkrajai, and L.W. Lake, "A Comprehensive Model of Temperature Behavior in a Horizontal Well," SPE 95656, Oct. 9-12, 2005, Dallas, TX, 15 pages.
G. Gao, and Y. Jalali, "Interpretation of Distributed Temperature Data During Injection Period in Horizontal Wells," SPE 96260, Oct. 9-12, 2005, Dallas, TX, 8 pages.
V. Pimenov, G. Brown, V. Tertychnyi, A. Shandrygin, and Y. Popov, "Injectivity Profiling in Horizontal Wells Through Distributed Temperature Monitoring," SPE 97023, Oct. 9-12, 2005, Dallas, TX, 8 pages.
D.K. Nath, R. Sugianto, and D. Finley, "Fiber-Optic Distributed Temperature Sensing Technology Used for Reservoir Monitoring in an Indonesia Steam Flood," SPE 97912, Nov. 1-3, 2005, Calgary, Alberta, Canada, 10 pages.
R.W. Clanton, J.A. Haney, R. Pruett, C.L. Wahl, J.J. Goiffon, and D. Gualtieri, "Real-Time Monitoring of Acid Stimulation Using a Fiber-Optic DTS System," SPE 100617, May 8-10, 2006, Anchorage, AK, 10 pages.
Office Action issued Nov. 29, 2007, for U.S. Appl. No. 11/398,483, 20 pages
Office Communication issued Dec. 10, 2007, for U.S. Appl. No. 11/398,483, 3 pages.
Office Action issued Sep. 26, 2008, for U.S. Appl. No. 11/398,503, 23 pages.
Office Action issued Apr. 14, 2009, for U.S. Appl. No. 11/398,503, 9 pages.
Office Action issued Jan. 12, 2010, for U.S. Appl. No. 12/167,884, 16 pages.
Office Action issued Jan. 13, 2010, for U.S. Appl. No. 12/167,910, 16 pages.
International Search Report with Written Opinion issued Jul. 4, 2011 for International Patent Application No. PCT/GB2010/001949, 15 pages.
International Search Report with Written Opinion issued Aug. 23, 2013 for International Patent Application No. PCT/US2013/044034, 14 pages.
Kading, Horace, and Hutchins, John S., "Temperature Surveys; The Art of Interpretation," American Petroleum Institute Division of Production, Mar. 12-14, 1969, 20 pages, Paper No. 906-14-N, Lubbock, Texas.
Sakaguchi, Keiichi, and Matsushima, Nobuo, "Temperature Profile Monitoring in Geothermal Wells by Distributed Temperature Sensing Technique," Geothermal Resources Council Transactions, Oct. 1995, 4 pages, vol. 19, Geological Survey of Japan, Higashi, Tsukuba, Ibaraki, Japan.
Henninges, J., Zimmermann, G., Buttner, G., Schrotter, J., Erbas, K, and Huenges, E.,"Fibre-Optic Temperature Measurements in Boreholes," FKPE-Workshop, Oct. 23-24, 2003, 9 pages, Hannover, Germany.
Johnson, David O., and Van Domelen, Mary, "StimWatch Stimulation Monitoring Service," Halliburton 2006 Special Meritorious Award for Engineering Innovation, 2006, 4 pages, Houston, Texas.
Knott, Terry, "Wytch Farm Sees the Light," Offshore Engineer, Dec. 1, 2000, 7 pages, oilonline.com.
Kading, Horace, "Shut-in Temperature Profiles Tell Where the Water Went," The Oil and Gas Journal, May 13, 1968, pp. 77-79.
Schlumberger, Oilfield Glossary, Term "Joule-Thomson," 2006, 1 page.
Halliburton Reservoir Performance Monitoring, 2005, 2 pages.

(56) References Cited

OTHER PUBLICATIONS

Nowak, T.J., "The Estimation of Water Injection Profiles from Temperature Surveys," Petroleum Transactions, AIME, 1953, pp. 203-212, vol. 198.

Sakaguchi, Keiichi, and Matsushima, Nobuo, "Temperature Logging by the Distributed Temperature Sensing Technique During Injection Tests," Proceedings World Geothermal Congress, May 28-Jun. 10, 2000, pp. 1657-1661, Kyushu—Tohoku, Japan.

Grobwig, St., Graupner, A. Hurtig, E., Kuhn, K., and Trostel, A., "Distributed Fibre Optical Temperature Sensing Technique—A Variable Tool for Monitoring Tasks," 8th International Symposium on Temperature and Thermal Measurements in Industry and Science, Jun. 19-21, 2001, pp. 9-17.

Hurtig, E., Ache, B., Grobwig, S., and Hanel, K., "Fibre Optic Temperature Measurements: A New Approach to Determine the Dynamic Behaviour of the Heat Exchanging Medium Inside a Borehole Heat Exchanger," TERRASTOCK 2000, 8th International Conference on Thermal Energy Storage, Aug. 28-Sep. 1, 2000, Stuttgart, Germany.

Ikeda, N., Uogata,K., Kawazoe, S., and Haruguchi, K., "Delineation of Fractured Reservoir by Transient Temperature Analysis Using Fiber Optic Sensor," Proceedings World Geothermal Congress, May 28-Jun. 10, 2000, pp. 2617-2621, Kyushu—Tohoku, Japan.

Halliburton, "The Impact of Wellbore Phenomena on Fluid Placement and Zonal Coverage", Gerard Glasbergen, Nov. 1-3, 2005, 9 pages.

Oxy Elk Hills, "Using Fiber Optics to Divert Acid on the Fly in the Monterey Shale", Ray Clanton, May 8-10, 2006, 46 pages.

Pruett Industries, "Fiber Optic Distributed Temperature Sensor 'DTS'", dated at least as early as 2001, 51 pages.

Office Action issued Jan. 2005 for U.S. Appl. No. 10/445,494, 6 pages.

Office Action issued Dec. 10, 2009 for U.S. Appl. No. 11/398,503, 8 pages.

Office Action issued Apr. 6, 2010 for U.S. Appl. No. 12/167,910, 15 pages.

Sierra, J., Kaura, J., Gualtieri, D., Glasbergen, G., Sarkar, D.,and Johnson, D.; "DTS Monitoring Data of Hydraulic Fracturing: Experiences and Lessons Learned," SPE 116182, Sep. 21-24, 2008, 15 pages, Denver, Colorado.

Examiner's Answer issued Jul. 13, 2010 for U.S. Appl. No. 11/398,503, 15 pages.

International Search Report with Written Opinion issued Aug. 19, 2010 for PCT Patent Application Serial No. PCT/US10/024100, 14 pages.

Office Action issued Jan. 28, 2011 for U.S. Appl. No. 12/603,299, 44 pages.

Partial Search Report issued Apr. 7, 2011 for International application No. PCT/GB2010/001949, 5 pages.

International Search Report issued May 21, 2004, for International Application Serial No. PCT/US03/09156, 2 pages.

Almaguer, Jim, Manrique, Jorge, Wickramasuriya, Saliya, et al., Orienting Perforations in the Right Direction, Oilfield Review, Spring 2002, pp. 16-31.

Gadeken, L.L., Fox, P.A., Brumley, J.L., et al., Enhancing Frac-Pack Evaluations with Directional and Spectral Gamma Ray Measurements, SPE38589, Oct. 5-8, 1997, pp. 241-253.

AFL; "Armored Stainless Steel Tubes", product article, dated 2008-2011, 1 page.

Fotech Solutions; "Oil and Gas", company brochure, dated 2010, 4 pages.

Unknown Author; "Helios Distributed Acoustic Sensor", informational paper, received Mar. 7, 2012, 2 pages.

Juan C. Juarez and Henry F. Taylor; "Field Test of a Distributed Fiber-Optic Intrusion Sensor System for Long Perimeters", Applied Optics, vol. 46, No. 11, dated Apr. 10, 2007, 4 pages.

Juan C. Juarez and Henry F. Taylor; "Polarization Discrimination in a Phase-Sensitive Optical Time-Domain Reflectometer Intrusion-Sensor System", Opticai Society of America, vol. 30, No. 24, dated Dec. 15, 2005, 3 pages.

Juan C. Juarez, et al.; "Distributed Fiber-Optic Intrusion Sensor System", Journal of Lightwave Technology, vol. 23, No. 6, dated Jun. 2005, 7 pages.

Silixa; "The Next Generation of Sensors", company web page, dated 2012, 1 page.

Silixa; "Intelligent Distributed Acoustic Sensor (IDAS)", product information, dated 2012, 1 page.

Silixa; "Energy", company brochure web page, dated 2012, 2 pages.

Silixa; "Intelligent Distributed Acoustic Sensor (IDAS): Listen at Every Point", product information, dated 2012, 1 page.

\* cited by examiner

LOCATION OF DOWNHOLE LINES

BACKGROUND

This disclosure relates generally to equipment utilized and operations performed in conjunction with a subterranean well and, in an example described below, more particularly provides for location of downhole lines.

In some advanced, intelligent or SMARTWELL™ completions, lines (such as, fiber optic or other cables, electrical lines, hydraulic lines, etc.) may be cemented in a well external to casing. After cementing, the casing and cement are typically perforated, in order to provide for flow between an interior of the casing and an earth formation surrounding the casing.

It will be appreciated that it would be beneficial to be able to prevent damage to the lines (for example, in perforating operations) by being able to accurately locate the lines relative to the casing downhole.

SUMMARY

In the disclosure below, systems and methods are provided which bring improvements to the art of locating lines downhole. One example is described below in which an optical waveguide is positioned external to the casing (such as, adjacent to, or as one of, the lines) and an acoustic source is deployed in the casing. Another example is described below in which distributed acoustic sensing is used to locate the position of an acoustic source relative to an optical waveguide external to, or otherwise positioned relative to, the casing.

A method of determining an azimuthal orientation of a well tool relative to a line in a well is described below. In one example, the method can include connecting at least one acoustic source to the well tool, the acoustic source having a known azimuthal orientation relative to the well tool; and detecting at least one acoustic signal transmitted from the acoustic source to an optical waveguide, the waveguide having a known azimuthal orientation relative to the line.

Also described below is a system for determining an azimuthal orientation of one or more lines relative to a well tool in a wellbore. The system, in one example, includes at least one acoustic source having a known azimuthal orientation relative to the well tool, and an optical waveguide connected to a distributed acoustic sensing instrumentation. The waveguide has a known azimuthal orientation relative to the lines, and the distributed acoustic sensing instrumentation detects acoustic signals transmitted from the acoustic source to the waveguide.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Figure 1:
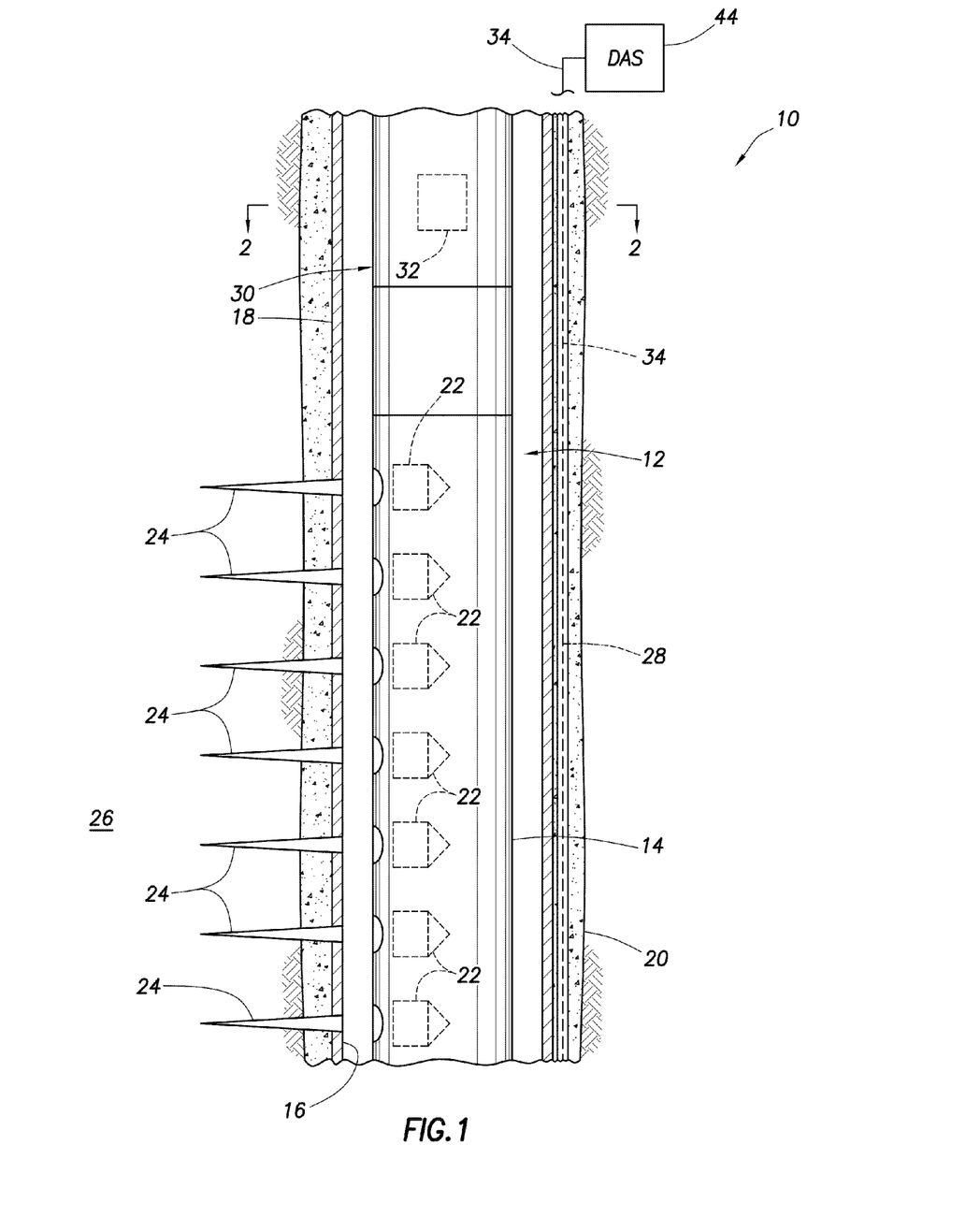
FIG. 1 is a representative partially cross-sectional view of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a well tool 12 is deployed into a wellbore 16 lined with casing 18 and cement 20. The well tool 12 in this example includes a perforating gun 14 with explosive shaped charges 22 for forming perforations 24 through the casing 18 and cement 20, and into an earth formation 26 penetrated by the wellbore.

The perforations 24 provide for fluid communication between the wellbore 16 and the formation 26. Such fluid communication might be used for producing fluid from the formation 26, for injecting fluid into the formation, or for any other purpose.

The term "casing" is used herein to indicate a protective wellbore lining. Casing can include specific tubulars known to those skilled in the art as "casing," "liner" or "tubing." Casing can be made of any material(s), including metals, composites, plastics, etc. Casing can be segmented or continuous. Casing can be pre-formed, or formed in situ.

The term "cement" is used herein to indicate a flowable material which hardens after being flowed into position in a well. Cement is typically used to seal off an annular area between a casing and a formation wall or another tubular. Cement can be made of a cementitious material, although other materials (such as resins, composites, foams, plastics, etc.) may be used.

At this point it should be noted that it is not necessary in keeping with the scope of this disclosure for the well tool 12 to include the perforating gun 14, or for perforations 24 to be formed through casing 18 or cement 20. In other examples, the well tool 12 could include other types of equipment, such as jetting tools, lateral tie-back tools, or any other types of tools. Equipment which can particularly benefit from the principles described herein include those for which it would be desirable to be able to accurately measure azimuthal orientation (that is, rotational orientation about a longitudinal axis) relative to one or more lines 28 positioned external to the casing 18.

In the FIG. 1 example, it is desired to know the azimuthal orientation of the charges 22 relative to the lines 28, so that the perforations 24 are not formed through the lines, thereby damaging the lines. Instead, it would be preferable for the perforations 24 to be formed in a direction away from the lines 28. In other examples, it may be desired to pierce the lines 28.

If the azimuthal orientation of the well tool 12 relative to the lines 28 can be accurately measured, then proper positioning of the well tool 12 can be confirmed. Or, if the azimuthal orientation of the well tool 12 is improper, then the orientation can be corrected (e.g., by rotating the well tool in the wellbore 16), using the relative orientation measurement as a basis for the correction.

For measuring the relative azimuthal orientation of the well tool 12 relative to the lines 28, an acoustic transmitter 30 is connected to the well tool. The transmitter 30 includes an acoustic source 32 which has a known azimuthal orientation relative to the well tool 12 (or a particular feature of the well tool, such as the perforating charges 22, a jetting nozzle, etc.). For example, when the transmitter 30 is assembled to the perforating gun 14 prior to being deployed into the wellbore 16, the azimuthal orientation of the acoustic source 32 relative to the charges 22 could be measured and/or fixed.

Acoustic signals transmitted by the transmitter 30 are sensed by an optical waveguide 34 (such as an optical fiber, an optical ribbon, etc.). The waveguide 34 may be one of the lines 28, the waveguide may be positioned adjacent the lines, or otherwise in a known azimuthal orientation relative to the lines.

Preferably, the optical waveguide 34 is one of the lines 28. The optical waveguide 34 may be part of a cable, or installed in a tube (such as a control line), before or after the tube is installed in the well. For example, the waveguide 34 could be pumped into a tube 36 (see FIG. 2) after the tube is cemented in the well external to the casing 18.

The optical waveguide 34 is only one example of an acoustic sensor which can detect acoustic signals transmitted by the well tool 12. In other examples, other types of acoustic sensors (e.g.; a piezoelectric receiver, an accelerometer, a strain sensor, etc.) may be used. Such sensors could be connected to lines other than optical waveguides (e.g., electrical lines, etc.).

Note that it is not necessary for the lines 28 to be positioned external to the casing 18. In other examples, the lines 28 (including the waveguide 34) could be in a sidewall of the casing 18. In further examples, the lines 28 could be internal to the casing 18. Thus, it should be clearly understood that the scope of this disclosure is not limited at all to the details of the system 10 as depicted in the drawings and described herein.

It is not necessary for the acoustic transmitter 30 to be rigidly connected to the perforating gun 14 or any other type of well tool. Instead, the acoustic transmitter 30 could be separately conveyed into the well and engaged with the perforating gun 14 (or other well tool), for example, using an orienting profile, so that the engaged transmitter has a known azimuthal orientation relative to the well tool.

In other examples, the orienting profile in the well could have a known azimuthal orientation relative to the lines 28. For example, the orienting profile could be interconnected in the casing 18. After engagement with the orienting profile, an azimuthal orientation of the separately conveyed acoustic transmitter 30 could be measured, for example, using a magnetometer, gravitometer or integrated gyroscope. The acoustic transmitter 30 would then be withdrawn from the well, and perforating charges in a gravity-oriented perforating gun could be selectively positioned to miss (or hit) the lines.

Figure 2:
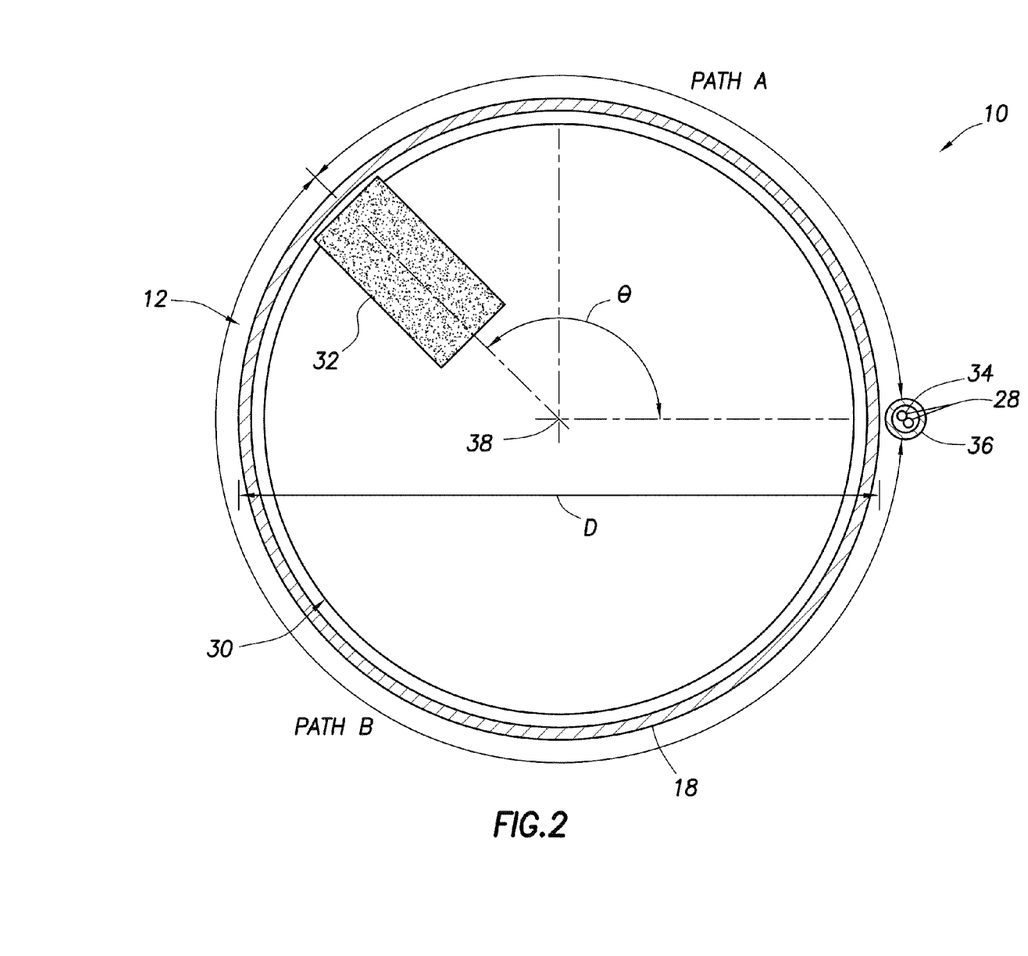
FIG. 2 is a representative cross-sectional view of the system, taken along line 2-2 of FIG. 1.

Referring additionally now to FIG. 2, a cross-sectional view of the system 10 is representatively illustrated, taken along line 2-2 of FIG. 1 (that is, through the acoustic transmitter 30). In this view, it may be more clearly seen how the azimuthal orientation of the acoustic source 32 can relate to the azimuthal orientation of the lines 28 (including the waveguide 34) with respect to a longitudinal axis 38 of the well tool 12.

The waveguide 34 serves as a sensor to detect acoustic signals transmitted by the acoustic source 32. Preferably, the waveguide 34 is part of a distributed acoustic sensing (DAS) system. For example, DAS instrumentation 44 can be connected to the waveguide 34 at the earth's surface, a subsea location, etc., and used to detect acoustic vibrations at any location along the waveguide.

Suitable DAS systems for use with the waveguide 34 are described in U.S. Publication Nos. 2011-0088462 and 2012-0014211. These prior publications are incorporated herein by this reference for all purposes.

The DAS instrumentation 44 effectively converts a length of single mode optical waveguide 34 into a distributed acoustic sensor, capable of detecting acoustic noise or sound waves continually along the waveguide's length. The waveguide 34 may be installed with the lines 28, or installed thereafter (e.g., pumped into a tube 36 after cementing the casing 18 and empty tube in the well).

The waveguide 34 may be used only for detecting the azimuthal orientation of the well tool 12, or it may be used for other purposes (for example, distributed temperature sensing (DTS), pressure sensing, data and/or command telemetry, etc.). If not used after detecting the azimuthal orientation of the well tool 12, the waveguide 34 may be removed, or it may be left in place.

The acoustic source 32 is depicted in FIG. 2 as being azimuthally oriented at an angle θ relative to the waveguide 34. When the acoustic source 32 emits an acoustic signal (such as, a bang, tap, impulse, sound, chirp, etc.), an acoustic pulse propagates away from the source.

Figure 3:
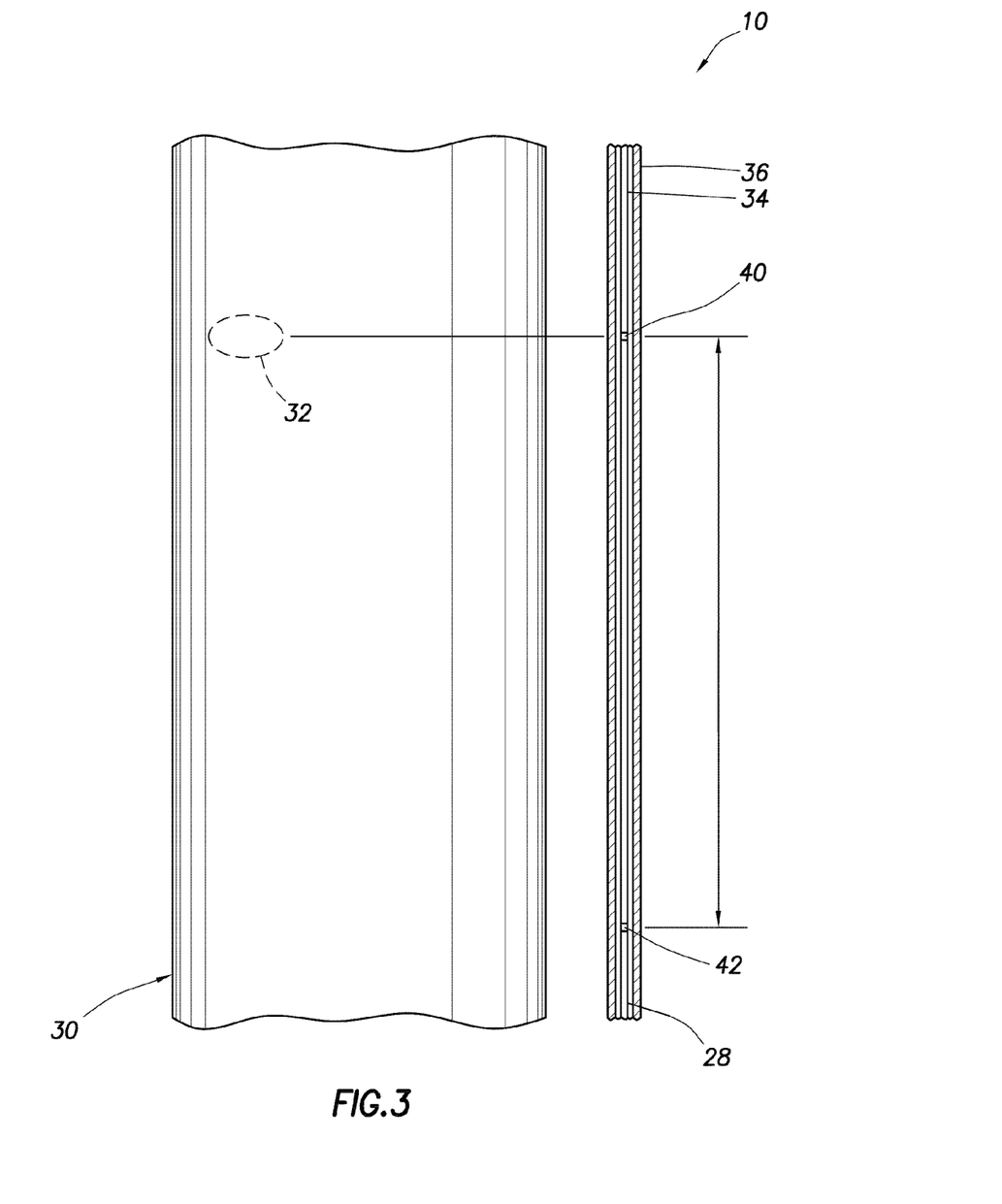
FIG. 3 is a representative elevational view of an acoustic source and a distributed acoustic sensor of the system.

The acoustic pulse travels around the circumference of the casing 18 from the acoustic source 32 to the waveguide 34, along Paths A & B illustrated in FIG. 2, assuming that the longitudinal positions of the acoustic source and the detection location along the waveguide are the same (e.g., location 40 shown in FIG. 3). Note that Path A is shorter than Path B.

As a result, two initial acoustic pulses will be detected by the waveguide 34 at location 40. These acoustic pulses will be separated in time as given by the following equation (1):

$$dt = D*(\pi - \theta)/v \qquad (1)$$

in which v is the speed of sound in the casing 18 material, and D is the diameter of the casing.

Note that there is no separation in time (only one pulse is detected) when $\theta = \pi$, since the source 32 would be pointing directly away from the waveguide 34, and the two Paths A & B would have the same length.

Similarly, if $\theta = 0$, only one pulse is detected. In this case, the two Paths A & B are the same, and they have no or minimal length. In order to differentiate between these two relative azimuthal orientations ($\theta = \pi$ and $\theta = 0$), the time at which the acoustic source 32 emits the acoustic signal should be known. The travel time to the waveguide 34 will be much shorter if $\theta = 0$, as compared to if $\theta = \pi$.

If two pulses are detected, the acoustic source 34 is oriented at an angle θ other than 0 or π relative to the waveguide 34. The angle θ is given by the following equation (2):

$$+/-\theta = \pi - (dt*v/D) \qquad (2)$$

Thus, by detecting a difference in time of acoustic pulses arriving at the waveguide 34, the azimuthal orientation of the acoustic source 32 (and the well tool 12 connected thereto) relative to the waveguide (and the lines 28) can be readily determined. In this manner, for example, the charges 22 can be confirmed as pointing away from the lines 28 or, if the charges are found to be pointing toward the lines, the well tool 12 can be rotated until the charges do not point toward the lines.

If acoustic damping in the system 10 is relatively low, one could (and likely would) detect multiple pulses, with diminishing amplitudes as acoustic waves make multiple passes about the circumference of the casing 18. These secondary pulses likely would rapidly distort, and one would likely start to see reflections from casing collars or other discontinuities, which would diminish the usefulness of all but the first received pulse or pulses in determining the orientation of the source 32 relative to the waveguide 34.

In this description, a detected "one pulse" or "two pulses" refers to the initial detected pulses which travel via direct routes from the source 32 to the waveguide 34, for example, without traveling completely around the casing 18, and without reflecting off of ends of the casing or other discontinuities, etc.

It is worth noting that the acoustic pulses from the source 32 will be detected all along the waveguide 34, and not just at the location 40 which is in the plane of the source, and at a same longitudinal position. As depicted in FIG. 3, the acoustic pulses will also be detected at another location 42 along the waveguide 34, with the location 42 being separated by a longitudinal distance Z from the location 40. It is conceived that detection of the acoustic signals at the location 42, as well as at the location 40, can be useful at least in confirming measurements made at the location 40, and possibly in providing enhanced spatial indications.

Although specific locations 40, 42 are mentioned above, it is understood that the waveguide 34, when connected to the DAS instrumentation 44, provides for detection of acoustic signals all along the waveguide. Specific detection locations 40, 42 along the waveguide 34 may be used for convenience when analyzing the detected acoustic signals.

In another example, frequency domain techniques may be used, instead of or in addition to the time domain techniques discussed above. In one example, the acoustic source 32 could emit an acoustic signal continuously, with the acoustic signal having a characteristic frequency and wavelength, as given by equation (3):

$$\lambda = \frac{v}{f}. \quad (3)$$

where $\lambda$ is the wavelength, f is the frequency, and v is the speed of sound in the casing 18 material. Neglecting attenuation, an acoustic wave will propagate with distance l from the source 32 according to the solution to the wave equation given by equation (4):

$$A(l) = A_0 \cos\left(\frac{2\pi}{\lambda} l\right). \quad (4)$$

where A(l) is the amplitude at distance l, and $A_0$ is the amplitude at the source 32. At location 42 depicted in FIG. 3, separated by distance Z from the source 32, an approximation of the total amplitude of the received wave is given by equation (5):

$$A(z) = A_0 \sum_{n=1}^{\infty} \cos\left(\frac{2\pi}{\lambda} l_n\right) \quad (5)$$

where A(z) is the amplitude at the location 42, and $l_n$ are the different path lengths between the source 32 and the location 42. The total acoustic power in the received wave (that signal which is detected at the source 32) is proportional to I(z) as given by equation (6):

$$I(z) = (A(z))^2 = \left[A_0 \sum_{n=1}^{\infty} \cos\left(\frac{2\pi}{\lambda} l_n\right)\right]^2. \quad (6)$$

The result is that, along the waveguide 34, acoustic energy will form an interference pattern which will depend on the variables D, θ, v, f and Z. With proper analysis of this interference pattern, the azimuthal orientation of the source 32 relative to the waveguide 34 can be readily determined. Thus, digital signal processing techniques known to those skilled in the art can be used to relate the interference patterns to the azimuthal orientation of the source 32 relative to the waveguide 34.

Therefore, it will be appreciated that the acoustic signals transmitted by the acoustic transmitter 30 could be continuous with a constant frequency, multiple different constant frequencies could be transmitted, and/or acoustic pulses could be transmitted. Various techniques known to those skilled in the art may be used to relate the transmitted acoustic signals (with constant or varying, and the same or different, frequencies, amplitudes, etc.) to the azimuthal orientation of the acoustic transmitter 30.

Figure 4:
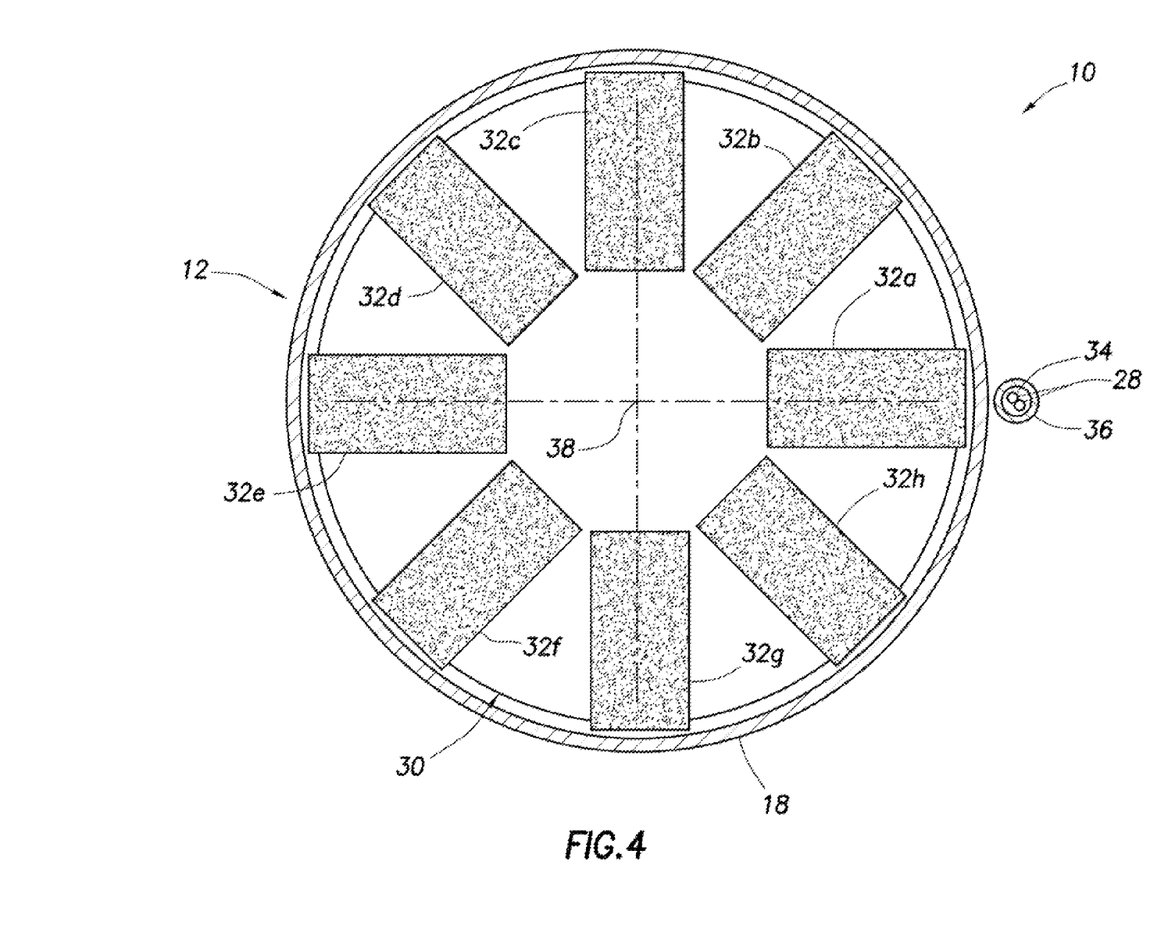
FIG. 4 is a representative cross-sectional view of the system, in which multiple acoustic sources are utilized.

Referring additionally now to FIG. 4, another example of the system 10 is representatively illustrated. In this example, the acoustic transmitter 30 includes multiple acoustic sources 32*a-h*.

Each acoustic source 32*a-h* could be associated with a particular well tool 12 or feature of a well tool. For example, each acoustic source 32*a-h* could be associated with a particular perforating gun 14, or a particular perforating charge 22 of a gun.

When the sources 32*a-h* emit acoustic signals, the time of travel from each of the sources to the waveguide 34 will be different, if the distances between the sources and the waveguide are different. For example, in the configuration depicted in FIG. 4, an acoustic signal transmitted from the source 32*a* will arrive at the waveguide 34 in less time than an acoustic signal transmitted from the source 32*d* will arrive at the waveguide.

Acoustic signals could be transmitted from the sources 32*a-h* in sequence and, by measuring the differences in travel times, the azimuthal orientation of the transmitter 30 relative to the waveguide 34 can be readily determined. For example, if it is determined that the acoustic source 32*a* is closest to the waveguide 34 (as depicted in FIG. 4), and the perforating charges 22 are aligned with any of the acoustic sources 32*c*-32*g*, it may be considered that it is acceptable to fire the charges to form the perforations 24.

If the charges 22 are aligned with either of the sources 32*b* or *h*, then it is less likely that it would be considered prudent to fire the charges, if damage to the lines 28 is to be avoided. If the charges are aligned with source 32*a*, then the charges would not be fired until after the perforating gun 14 is repositioned (unless, of course, the objective is to pierce the lines 28).

It is expected that the amplitudes of the pulses received from the different sources 32*a-h* at the waveguide 34 will also be different. The largest amplitude would be received from the source 32*a*, and the least amplitude would be received from the source 32*e*, in the situation depicted in FIG. 4. Comparison of the pulse amplitudes, thus, provides another way to determine the azimuthal orientation of the transmitter 30 relative to the waveguide 34.

Multiple sources 32*a-h* may be used to transmit acoustic signals at multiple different azimuthal orientations. Alternatively, a single acoustic source 32 could be rotated relative to the well tool 12, with the source transmitting acoustic signals at different azimuthal orientations. In this example, the well tool 12 could rotate with the acoustic source, if desired.

The acoustic sources 32, 32a-h described above can be relatively simple electrical, mechanical, fluid-operated or otherwise actuated devices. For example, a spring-loaded metal striker activated by a pulsed electromagnetic solenoid could be a suitable acoustic source. A piezoelectric or electrostrictive material may be used to produce an acoustic pulse. Fluid could be ejected from, or received into, the well tool 12, thereby creating acoustic "noise." A laser could be pulsed to generate vibrations in the casing 18. An acoustic signal could be generated by scraping on the casing 18. Any manner of producing the acoustic signal may be used, in keeping with the scope of this disclosure.

One beneficial aspect of the system 10 (in any of the examples of FIGS. 1-4) is that no radioactive materials are used to indicate the azimuthal orientation of the lines 28. The method described above should also provide reliable and accurate determination of the azimuthal orientation of the well tool 12 relative to the lines 28.

There is no need to modify current techniques of installing lines external to casing, or in a casing sidewall. The DAS instrumentation 44 may only be used during the determination of the azimuthal orientation of the well tool 12, after which the DAS instrumentation can be used at other locations (although the DAS instrumentation could also be used for long-term monitoring of the well, e.g., as described in the above-incorporated application disclosures).

Lines 28 can be installed internal or external to the casing 18, or in a sidewall of the casing, without concern that perforations 24 will later pierce the lines, or that other types of well tools will damage the lines. The waveguide 34 can be installed with the lines 28, or later when a need arises to determine the azimuthal orientation of the well tool 12 relative to the lines.

A method of determining an azimuthal orientation of a well tool 12 relative to a line 28 in a well is described above. In one example, the method can comprise: connecting at least one acoustic source 32 to the well tool 12, the acoustic source 32 having a known azimuthal orientation relative to the well tool 12; and detecting at least one acoustic signal transmitted from the acoustic source 32 to an optical waveguide 34 or other type of acoustic sensor, the acoustic sensor having a known azimuthal orientation relative to the line 28.

The line 28 may comprise the waveguide 34, whereby the waveguide 34 has the same azimuthal orientation as the line 28. The line 28 can be positioned external to a casing 18, in a sidewall or the casing, inside the casing, or in any other position. The waveguide 34 can be positioned external to a casing 18, or in any other position.

The well tool 12 in one example comprises a perforating gun 14. The method can include determining an azimuthal orientation of the perforating gun 14 relative to the line 28, based on the acoustic signal detecting step.

The method can include determining the azimuthal orientation of the well tool 12 relative to the line 28, based on a difference in time between multiple acoustic signals being detected, and/or based on a difference in interference patterns between multiple detected acoustic signals.

Multiple acoustic sources 32a-h can be connected to the well tool 12, with each acoustic source having a different azimuthal orientation relative to the well tool 12. The acoustic source 32 may transmit the acoustic signal at multiple different azimuthal orientations relative to the well tool 12.

Distributed acoustic signals can be detected along the waveguide 34. The acoustic signal can be detected at multiple longitudinally spaced apart locations 40, 42 along the waveguide 34.

Also described above is a system 10 for determining an azimuthal orientation of one or more lines 28 relative to a well tool 12 in a wellbore 16. In one example, the system 10 can include at least one acoustic source 32 having a known azimuthal orientation relative to the well tool 12, and an optical waveguide 34 connected to a distributed acoustic sensing instrumentation 44, the waveguide 34 having a known azimuthal orientation relative to the lines 28. The distributed acoustic sensing instrumentation 44 detects acoustic signals transmitted from the acoustic source 32 to the waveguide 34.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of determining an azimuthal orientation of a well tool relative to a line in a well, the method comprising:

connecting at least one acoustic source to the well tool, the acoustic source having a known azimuthal orientation relative to the well tool;

detecting at least one acoustic signal transmitted from the acoustic source to an acoustic sensor, the sensor having a known azimuthal orientation relative to the line, wherein an azimuthal orientation of the acoustic source relative to the sensor is unknown prior to the detecting; and analyzing the at least one acoustic signal detected by the sensor, thereby determining the azimuthal orientation of the acoustic source relative to the sensor, and thereby permitting the azimuthal orientation of the well tool relative to the line to be determined.

2. The method of claim 1, wherein the acoustic sensor comprises an optical waveguide.

3. The method of claim 2, wherein the line comprises the waveguide, whereby the waveguide has the same azimuthal orientation as the line.

4. The method of claim 2, wherein the waveguide is positioned external to a casing.

5. The method of claim 2, wherein distributed acoustic signals are detected along the waveguide.

6. The method of claim 2, wherein the acoustic signal is detected at multiple longitudinally spaced apart locations along the waveguide.

7. The method of claim 1, wherein the line is positioned external to a casing.

8. The method of claim 1, wherein the well tool comprises a perforating gun, and further comprising determining an azimuthal orientation of the perforating gun relative to the line in response to the analyzing.

9. The method of claim 1, wherein the determining the azimuthal orientation of the acoustic source relative to the sensor is based on a difference in time between multiple acoustic signals being detected.

10. The method of claim 1, wherein the determining the azimuthal orientation of the acoustic source relative to the sensor is based on a difference in interference patterns between multiple detected acoustic signals.

11. The method of claim 1, wherein the determining the azimuthal orientation of the acoustic source relative to the sensor is based on a difference in amplitude between multiple detected acoustic signals.

12. The method of claim 1, wherein multiple acoustic sources are connected to the well tool, each acoustic source having a different azimuthal orientation relative to the well tool.

13. The method of claim 1, wherein the acoustic source transmits the acoustic signal at multiple different azimuthal orientations relative to the well tool.

14. The method of claim 1, wherein the acoustic signal is transmitted continuously with a substantially constant frequency.

15. The method of claim 1, wherein the acoustic signal comprises multiple signals with different frequencies.

16. The method of claim 1, wherein the acoustic signal comprises acoustic pulses.

17. A system for determining an azimuthal orientation of one or more lines relative to a well tool in a wellbore, the system comprising:

at least one acoustic source having a known azimuthal orientation relative to the well tool;

an acoustic sensor which detects at least one acoustic signal transmitted from the acoustic source, the sensor having a known azimuthal orientation relative to the one or more lines, and wherein an azimuthal orientation of the acoustic source relative to the sensor is unknown prior to transmission of the at least one acoustic signal; and instrumentation which analyzes the at least one acoustic signal detected by the sensor and determines the azimuthal orientation of the acoustic source relative to the sensor, thereby permitting the azimuthal orientation of the one or more lines relative to the well tool to be determined.

18. The system of claim 17, wherein the sensor comprises an optical waveguide.

19. The system of claim 18, wherein the one or more lines comprise the waveguide, whereby the waveguide has the same azimuthal orientation as the lines.

20. The system of claim 17, wherein the lines are positioned external to a casing.

21. The system of claim 17, wherein the well tool comprises a perforating gun.

22. The system of claim 17, wherein the azimuthal orientation of the acoustic source relative to the sensor is determined, based on a difference in time between multiple acoustic signals being detected.

23. The system of claim 17, wherein the azimuthal orientation of the acoustic source relative to the sensor is determined, based on a difference in interference patterns between multiple detected acoustic signals.

24. The system of claim 17, wherein the azimuthal orientation of the acoustic source relative to the sensor is determined, based on a difference in amplitude between multiple detected acoustic signals.

25. The system of claim 17, wherein multiple acoustic sources are connected to the well tool, each acoustic source having a different azimuthal orientation relative to the well tool.

26. The system of claim 17, wherein the acoustic source transmits the acoustic signal at multiple different azimuthal orientations relative to the well tool.

27. The system of claim 17, wherein the acoustic signal is transmitted continuously with a substantially constant frequency.

28. The system of claim 17, wherein the acoustic signal comprises multiple signals with different frequencies.

29. The system of claim 17, wherein the acoustic signal comprises acoustic pulses.

30. The system of claim 17, wherein the instrumentation comprises a distributed acoustic sensing system.

* * * * *